Nov. 4, 1952

E. J. DUNHAM 2,616,578

INDUSTRIAL TRUCK

Filed May 12, 1949

INVENTOR.
ELMER J. DUNHAM
BY Brown, Jackson,
Boettcher & Dienner
ATTY.

Nov. 4, 1952  E. J. DUNHAM  2,616,578
INDUSTRIAL TRUCK
Filed May 12, 1949  3 Sheets-Sheet 2

INVENTOR.
ELMER J. DUNHAM
BY Brown, Jackson,
Boettcher & Dienner
ATTY.

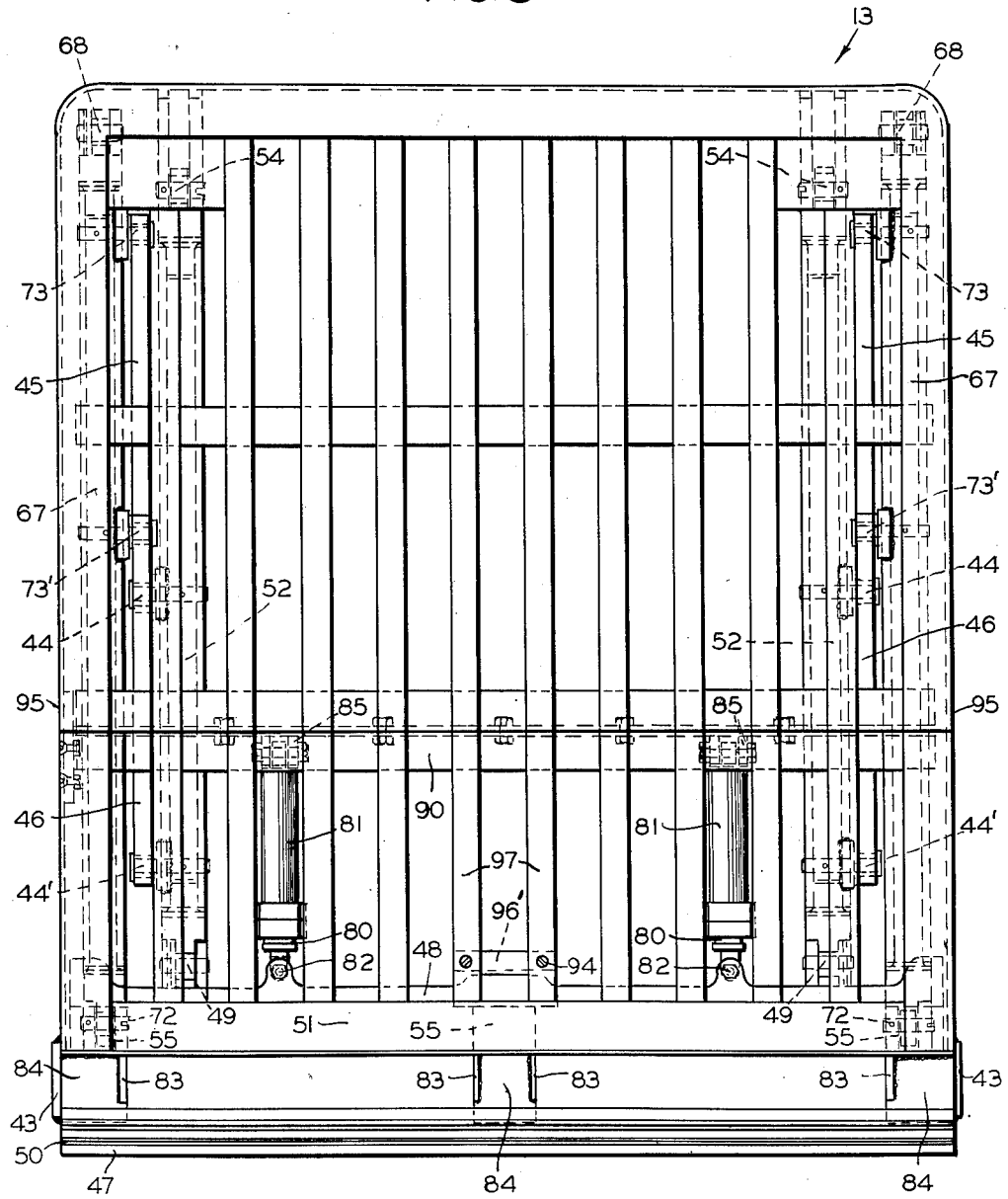

Patented Nov. 4, 1952

2,616,578

UNITED STATES PATENT OFFICE 2,616,578

INDUSTRIAL TRUCK

Elmer J. Dunham, Battle Creek, Mich., assignor to Clark Equipment Company, Buchanan, Mich., a corporation of Michigan Application May 12, 1949, Serial No. 92,913

5 Claims. (Cl. 214—82)

My invention relates to industrial trucks, and more particularly to an industrial truck having load supporting means, as for example, in the form of lift forks or an apron, mounted on a load elevating and supporting carriage, and with which a mechanism is provided to draw a sheet-like pallet on which a load is disposed, onto the load supporting means of the truck and to push the load off of the load supporting means.

The present invention constitutes an improvement on industrial trucks disclosed in the copending applications of George L. Turner, Serial No. 55,982, filed October 22, 1948, and Elmer J. Dunham and Alfred Wayne Gunning, Serial No. 80,738, filed March 10, 1949.

The present mechanism of my invention is adapted to be embodied with a more or less conventional type of load supporting carriage, and preferably is adapted for hydraulic actuation. The mechanism primarily comprises a load engaging rack which is disposed vertically with respect to the load supporting forks or apron, and may be actuated through a linkage system pivotally mounted between a supporting member carried by the load supporting carriage and the load engaging rack under the influence of hydraulic piston and cylinder means connected to the linkage system for pushing a load off of the load supporting means. Also, mounted on the lower end of the load engaging rack are a fixed jaw and a movable jaw defining a selectively operable clamp means, which may be actuated by suitable hydraulic piston and cylinder means, for clamping the edge of a sheet-like pallet to draw the latter onto the load supporting means of the truck in retracting of the load engaging rack through the aforementioned linkage system and hydraulic actuating means therefor.

The linkage means of the pusher mechanism is capable of retraction to a folded position in juxtaposition of the supporting member, with the rack disposed closely adjacent the heel of the load supporting means, and is capable of expansion to a position beyond the forward extremity of the load supporting means.

The pallet clamping mechanism which is mounted on the load engaging rack may be held in an open or closed position regardless of the position of the pusher mechanism.

One of the primary objects of the present invention is to provide a pusher mechanism as described, embodying a pallet clamping mechanism of the character indicated in which suitable means may be provided for effecting the selective actuation of the pusher and clamping mechanisms.

It is another object of my invention to provide control means for the operator of the industrial truck whereby the pallet clamping mechanism and the pusher mechanism may be operated by the driver of the truck from the driver's seat.

A further object of my invention is to provide a load engaging rack of the character indicated in which suitable hydraulic actuating equipment for the clamping mechanism is arranged to lie within the confines of the rack so that the latter may be moved with respect to the load supporting means in the manner indicated without interference of the hydraulic actuating mechanism with other parts of the truck.

A still further object of my invention is to provide restraining means for the linkage system for substantially eliminating relative movement of the rack with respect to the load supporting frame when the rack is disposed closely adjacent to or in fully retracted position.

Other objects, features and advantages of my invention will be apparent from the following detailed description.

Now in order to acquaint those skilled in the art with the manner of constructing and using devices in accordance with my present invention, I shall describe in connection with the accompanying drawings a preferred embodiment of my invention.

In the drawings:

Figure 3 is a front elevational view of the pusher mechanism shown in Figure 2.

Figure 1:
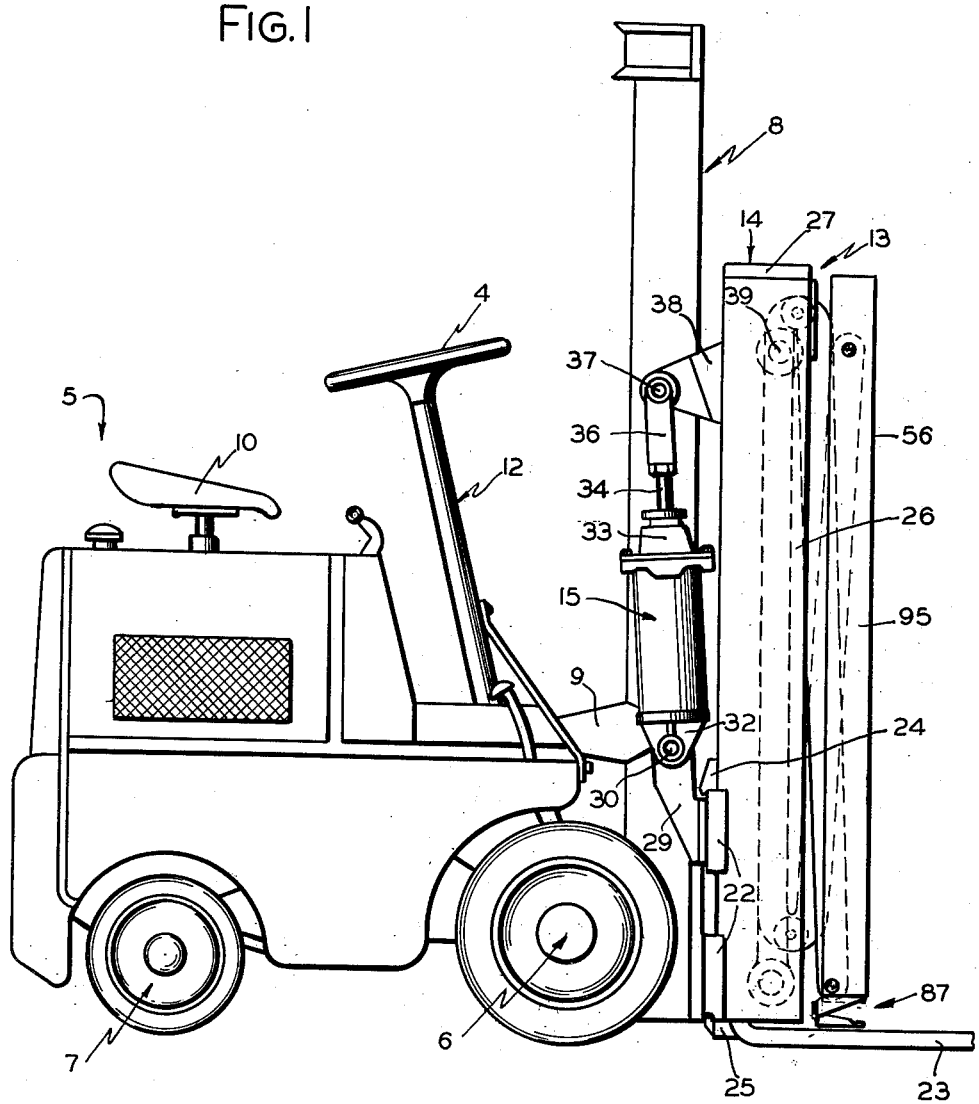
Figure 1 is a side elevational view of an industrial truck embodying my present invention.

Referring now in detail to the drawings, I have shown a conventional form of industrial lift truck, indicated generally at 5, having the usual forward driving and rear steering wheels 6 and 7, respectively. The truck, adjacent its forward end, is provided with a vertical mast 8 pivotally mounted for limited fore and aft movement. The mast has a suitable bracket means 9, connected in a known manner to a hydraulically controlled piston for controlling the tilting movement of the same.

The driver's seat is indicated at 10 and is disposed adjacent the steering column 12 having at its upper end a conventional steering wheel 4, which is manipulated by the operator. The truck is provided with a power plant, such as an internal combustion engine, having pump means associated there-with for developing fluid under pressure which is used for raising and lowering a load supporting and elevating carriage 14 guided for vertical movement within the mast 8 and for tilting the latter in a known manner, and for actuating the pusher and clamping mechanisms in a manner to be described.

The pusher mechanism, indicated generally at 13, is suitably mounted on a load supporting frame 14 which, as noted, is mounted for vertical movement relative to the mast 8. The frame 14 provides for the support of suitable load supporting means which in the embodiment shown may comprise a pair of forwardly projecting load engaging forks 23 disposed in spaced relation transversely of the forward end of the truck. The forks 23 are supported in vertically spaced face plates 22 of the carriage and each fork is provided with upper and lower tongue members 24 and 25 which engage, respectively, with the upper and lower edges of the upper and lower face plates 22.

The load supporting frame 14 is further defined by a pair of vertically extending frame or supporting members 26 rigidly secured at their lower ends one each adjacent the outer ends of the face plates 22, and the frame or supporting members 26 are connected at their upper ends by a transverse plate member 27.

Extending rearwardly from the upper face plate 22 adjacent each end thereof, but within the confines of the supporting members 26, are brackets 29 which may be welded or otherwise secured to the rear face of the upper face plates 22 and which, at their upper ends form pivotal supports as indicated at 30, for the bases 32 of a pair of hydraulic cylinder assemblies, one of which is indicated generally at 15, and which has the head end 33 thereof provided with a suitable gland assembly for receiving the extending portion 34 of the piston rod disposed within the cylinder.

The pair of hydraulic cylinder assemblies 15 are identical in construction and are mounted in the same manner in view of which the following description will be limited to the one shown in the drawing. It is preferred to provide a pair of hydraulic cylinder assemblies for uniformity in operation of the pusher mechanism and to prevent cocking of the pusher member although it will be understood that, if desired, a single cylinder assembly may be used.

The piston rod 34, at its upper end, is connected through a suitable clevis member 36 to a shaft 37, which is pivotally mounted in the rearwardly extending end of a crank member 38. The forward end of crank 38 lies closely adjacent the inner surface of the plate 26, and the crank member 38 at its inner end is made fast to a shaft 39 which is rotatably journaled in brackets secured to and depending from the transverse member 27.

A suitable linkage system, provided between the load supporting frame 14 and a load engaging rack 56, comprises a pair of arms 42 fixed to the outer ends of shaft 39 and the crank members 38. The arms 42 are pivotally connected as at 49, at their other ends, one to each of a pair of arms 52. The opposite ends of the arms 52 are each secured to the rear face of the rack member, indicated generally at 56, by means of pivotal connections 54. Stub shafts 93 extending laterally outwardly are suitably secured, as by welding, to the arms 52. The stubs 93 carry rollers 96 for a purpose which will be hereinafter referred to.

The rack member 56 comprises a vertically extending plate or grid which has substantially the same vertical and horizontal extent as the supporting side plate 26. The rack 56 serves, in addition to its function as a pusher, as a support or carrier for the clamping means so that by the linkage system described the clamping means may be advanced or returned as desired.

The aforementioned linkage system further comprises a pair of arms 63 connected at one end to a shaft 62 and at the other ends, by means of pivotal connections 69, to arms 67, which are further mounted adjacent the rear face of the vertical rack member 56 by means of pivotal connections 72. The shaft 62 is journaled at its opposite ends in brackets 64 secured at the lower ends of and inwardly of the supporting frame members 26.

In the aforesaid described arrangement of arms there is provided a pair of links 45 one each extending between each set of arms 42 and 67, and these links are pivotally connected to the latter arms as indicated at 44 and 73, respectively. Also, a second pair of links 46 are provided one for each set of arms 42 and 67 and have pivotal connection near their opposite ends as indicated at 44' and 73' to arms of 42 and 67, respectively. The projecting ends 91 of the pair of links 46 are formed in the shape of wedges having inclined surfaces 92, which are adapted to cooperate with the rollers 96 in a manner to be described. Grooves 98 are formed in the pair of links 45 for a purpose which will be hereinafter referred to.

Suitable bracing means also preferably provided to eliminate the disadvantage of having the upper end of the rack 56 tilt rearwardly when the upper end of the rack is engaged with a load to a greater extent than the lower portion of the rack. Such bracing means comprises a crank arm 76, secured to the shaft 62 inwardly of the near side frame member 26, a bracket member 77 secured to crank member 38 disposed rearwardly of the upper shaft 39, and a rod 78 provided at its opposite ends for pivotal connection to the crank arm 76 and bracket member 77.

The linkage system described above provides a pantograph type of motion with the interconnecting links 45 and 46 providing a limiting control for preventing extension of the rack 56 beyond a predetermined point of the forward ends of the load supporting forks 23.

In accordance with my present invention, I propose to provide a selectively operable pallet clamping means, indicated generally at 87 at the lower portion of the load engaging rack 56. The clamping means 87, as shown, comprises a pair of end brackets 43 secured to the lower ends of the vertical side frame portion 95 of rack 56. A fixed jaw 47 extends transversely between the brackets 43 and is suitably secured, as by welding, at its opposite ends thereto. A movable jaw member 48 for cooperating with fixed jaw 47 is carried in the lower end of the rack member 56 between the end brackets 43 and is guided in the rack member for vertical movement toward and away from the fixed jaw 47 between a front plate member 51 extending transversely between the inner edges of the vertical side frame portions 95 of the rack 56 and vertically extending flanges of a plurality of rear angle members 55 disposed in spaced relation along the bottom of the rack 56.

The fixed jaw 47 is additionally braced by means of a plurality of vertical plate members 84 secured at their upper edges to the adjacent rear edge portions of the horizontal flanges of the plurality of angle members 55 and at their lower edges to the rear of the fixed jaw 47. The upper edge of the vertically extending flange of the angle member 55, located centrally of the ends of the rack, is secured to a plate member 94 as by welding. A spacer member 96 is mounted between the plate member 94 and the adjacent vertical ribs 97 of the rack 56 and the spacer member 96 together with the upper end portion of plate member 94 are secured as by bolts to the vertical ribs 97 of the rack 56. In addition to the end brackets 43, a plurality of triangular reinforcing brackets 83 are disposed in spaced relation along the length of the angle member 55 and are secured at their top edges to the latter and at their rear edges to the sides of the rear plate members 84 as by welding.

The lower edge of movable jaw 48 is adapted to seat within a conformably shaped groove 58 in lower jaw 47 in order to clamp the margin of a sheet-like pallet therebetween. The movable jaw 48 is actuated by the operator through suitable remote control means including pressure hoses connected to the hydraulic cylinder assemblies disposed near each end of the movable jaws. The hydraulic cylinder assemblies each comprises a piston rod 89, secured at its lower end to the movable jaw 48 by means of a bolt 82, and a cylinder 81, which is pivotally mounted at its upper end in a bracket 85, which is suitably secured to a rigid transverse member 90 of the rack 56. As shown, the cylinder 81 and the above described mounting means therefore lie entirely within the confines of the rack member 56.

Figure 2:
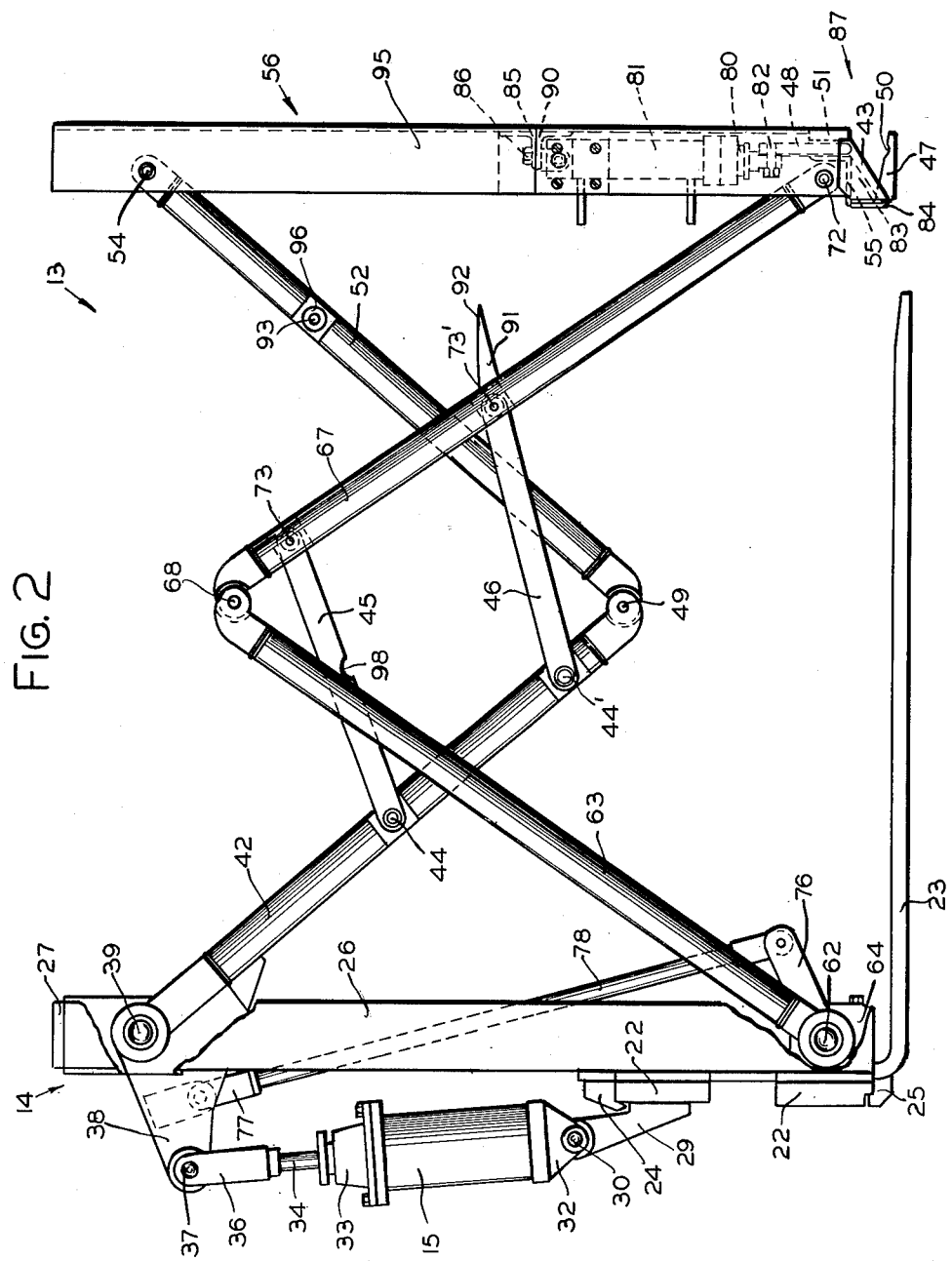
Figure 2 is an enlarged elevational view showing the pushed mechanism of the truck of Figure 1 in extended position, and clamping mechanism associated with the load engaging means in open position.

The operation of the aforedescribed construction is as follows:

When the piston in each of the cylinders 15 is moved upwardly from the position shown in Figure 2, it produces a corresponding pull in a clockwise direction upon the arms 42. This, in turn, moves the pivotal connection 49 between arms 42 and 52 downwardly retracting the upper end of the rack 56. Simultaneously, due to the interconnection of the links 45 and 46 between arms 42 and 67, the arms 63 are rotated in a counterclockwise direction together with shaft 62 drawing the pivotal connections 68 toward the upper portion of the support 26 and, consequently, retracting the lower end of the rack 56. When the rack 56 nears its fully retracted position the inclined surfaces 92 of the projecting ends 91 of links 46 engage the rollers 96 mounted on stub shafts 93, which are secured to arms 52 to prevent relative movement of the upper end of the rack 56 with respect to the supporting frame 14 when the rack 56 is disposed closely adjacent to or fully retracted with respect to the frame 14. When the rack 56 is in a fully retracted position the rollers 96 are adapted to seat within the grooves 98 formed in the pair of links 45.

The interconnection of the links 45 and 46 produces conjoint movement of the rack toward a retracted position as shown in Figure 1 with the arms 42 and 63 being nested within the side plates 26 of the support.

Similarly, when the piston is moved downwardly in the cylinder 15, it produces a corresponding rotation of crank 38 to rock arms 42 in a counterclockwise direction, thereby raising the pivotal point 49 and extending the rack 56, the arms 63 being simultaneously rotated in a clockwise direction to apply substantially equal thrust to the top and bottom of the rack for maintaining it in a vertical plane while it is being moved horizontally.

From the foregoing, it will be apparent that the load supporting carriage, which is movable vertically on the mast 8, carries with it the load engaging mechanism 56 which serves as a pushing or discharging device and a load steadying device, and also carries with it the hydraulic mechanisms 15 for actuating the load engaging mechanism. For a more detailed description of the pusher mechanism described above and its mode of operation, reference may be had to the aforementioned joint application of myself and Alfred Wayne Gunning, Serial No. 80,738, filed March 10, 1949.

The operation of the pallet clamping mechanism is as follows:

When the pistons in the cylinders 81 are moved downwardly from the position shown in Figure 2, as by admission of fluid under pressure to the upper ends of the cylinder, they push the movable jaw 48 downwardly toward the groove 58 of fixed jaw 47 and clamp therebetween with a crimping action the margin of the sheet-like pallet adapted to be disposed therebetween. When the pistons in the cylinders 81 are moved upwardly to the position shown in Figure 2, they retract the movable jaw 48 from the fixed jaw 47, and release the pallet which the clamping means is adapted to grip.

It will be understood that separate known controls are provided close to the operator for the tilt mechanism, telescoping mast, pusher device, and pallet retaining mechanism so that such mechanisms may be independently manipulated as required.

A typical loading and unloading operation will now be described. After the operator maneuvers the truck to a position where the forks are substantially in front of a pallet supported load, he operates the controls for the pallet clamping means so as to dispose the upper jaw 48 in retracted position with respect to lower jaw 47. The pusher mechanism formed in part by rack 56 may then be caused to be moved outwardly toward the front ends of the forks 23, until the jaws 47 and 48 are disposed, respectively, below and above an edge of the pallet upon which a load is mounted. The mechanism in the position described above is shown in Figure 2.

The operator then effects closing of the upper movable jaw so as to grip the pallet edge and while keeping the jaws closed, effects retraction of the pusher mechanism pulling the pallet and load on to the forks 23. When the rack is fully retracted and the pallet and load are fully supported by the forks 23 of the truck, the operator may drive the truck away.

The reverse procedure is followed when depositing the load. The operator maneuvers the truck so that the forks are positioned where the load is to be deposited. The pallet retaining jaws are first opened, thus releasing the pallet, and then simultaneously the truck is backed up and the rack member 56 is moved outwardly until the forks 23 are completely withdrawn from under the load. As will be seen, this simultaneous motion of the rack and fork in opposite directions permits the rack to engage the load until the load is pushed entirely off of the truck, thus steadying the load while it is being deposited.

If desired, the unloading operation may be accomplished without backing up of the truck as above described.

It will be apparent that various details of construction may be modified or varied without departing from the spirit and scope of my invention, and I, therefore, do not intend to be limited to the illustrated embodiment, except insofar as defined by the appended claims.

I claim:

1. A pusher mechanism for an industrial truck having carriage means mounted thereon and including load engaging means extending forwardly of the truck for supporting a load to be carried by the truck comprising, a supporting frame adapted to be mounted on said carriage means to extend transversely of said load supporting means closely adjacent the inner end thereof, said supporting frame comprising a pair of side frame members extending vertically adjacent opposite sides of said load supporting means, and a pair of shafts extending horizontally between said side frame members one adjacent each of the upper and lower ends thereof, a load engaging rack adapted to extend substantially vertically above said load engaging means, and linkage means between said shafts and said rack comprising, first arm means mounted at one end of the shaft extending between the upper ends of said side frame members, second arm means pivotally mounted at one end adjacent the upper end of said rack, said first and second arm means extending downwardly toward each other and being pivotally connected together adjacent their other ends, third arm means mounted at one end of a shaft extending between the lower ends of said side frame members, fourth arm means pivotally mounted at one end adjacent the lower end of said rack, said third and fourth arm means extending upwardly toward each other and being pivotally connected together, adjacent their other ends, first and second link means extending between said first and fourth arm means, said second link means having projecting ends substantially in the shape of wedges, said second arm means having stub shafts extending laterally outwardly therefrom, roller means carried by said stub shafts, and said projecting wedges of said second link means being adapted to engage said rollers when the rack is disposed adjacent to or in fully retracted position with respect to the supporting frame.

2. A pusher mechanism for an industrial truck having carriage means mounted thereon and including load engaging means extending forwardly of the truck for supporting a load to be carried by the truck, comprising, a supporting frame adapted to be mounted on said carriage means to extend transversely of said load supporting means closely adjacent the inner end thereof, said supporting frame comprising a pair of side frame members extending vertically adjacent opposite sides of said load supporting means, and a pair of shafts extending horizontally between said side frame members one adjacent each of the upper and lower ends thereof, a load engaging rack adapted to extend substantially vertically above said load engaging means, and linkage means between said shafts and said rack comprising, first arm means mounted at one end on the shaft extending between the upper ends of said side frame members, second arm means pivotally mounted at one end adjacent the upper end of said rack, said first and second arm means extending downwardly toward each other and being pivotally connected together adjacent their other ends, third arm means mounted at one end of a shaft extending between the lower ends of said side frame members, fourth arm means pivotally mounted at one end adjacent the lower end of said rack, said third and fourth arm means extending upwardly toward each other and being pivotally connected together, adjacent their other ends, first and second link means extending between said first and fourth arm means, and means between said second link means and said second arm means for preventing movement of the upper end portion of said load engaging rack relative to said supporting frame when said rack is disposed closely adjacent to or in fully retracted position with respect to said supporting frame.

3. A pusher mechanism for an industrial truck having carriage means mounted thereon and including load engaging means extending forwardly of the truck for supporting a load to be carried by the truck comprising, a supporting frame adapted to be mounted on said carriage means to extend transversely of said load supporting means closely adjacent the inner end thereof, said supporting frame comprising a pair of side frame members extending vertically adjacent opposite sides of said load supporting means, and a pair of shafts extending horizontally between said side frame members one adjacent each of the upper and lower ends thereof, a load engaging rack adapted to extend substantially vertically above said load engaging means, and linkage means between said shafts and said rack comprising, first arm means mounted at one end on the shaft extending between the upper ends of said side frame members, second arm means pivotally mounted at one end adjacent the upper end of said rack, said first and second arm means extending downwardly toward each other and being pivotally connected together adjacent their other ends, third arm means mounted at one end of a shaft extending between the lower end of said side frame members, a fourth arm means pivotally mounted at one end adjacent the lower end of said rack, said third and fourth arm means extending upwardly toward each other and being pivotally connected together, adjacent their other ends, first and second link means extending between said first and fourth arm means, said second link means having projecting ends substantially in the shape of wedges, said second arm means having stub shafts extending laterally outwardly therefrom, roller means carried by said stub shafts, said projecting wedges of said second link means being adapted to engage said rollers when the rack is disposed adjacent to or in fully retracted position with respect to the supporting frame, a first crank means connected to the shaft between the upper ends of said side frame members and extending generally rearwardly of said supporting frame means, a second crank means connected to the shaft between the lower ends of said side frame members and extending generally forwardly of said suporting frame, and rod means pivotally connected at the opposite ends thereof to said crank means.

4. A pusher mechanism for an industrial truck having carriage means mounted thereon and including load engaging means extending forwardly of the truck for supporting a load to be carried by the truck comprising, a supporting frame adapted to be mounted on said carriage means to extend transversely of said load supporting means closely adjacent the inner end thereof, a load engaging rack adapted to extend substantially vertically above said load supporting means, linkage means between said supporting frame and said rack comprising, first arm means mounted at one end to the upper end of said supporting frame, second arm means pivotally mounted at one end adjacent the upper end of said rack, said first and second arm means extending downwardly toward each other and being pivotally connected together adjacent their other ends, third arm means mounted at one end adjacent the lower end of said supporting frome, fourth arm means pivotally mounted at one end adjacent the lower end of said rack, said third and fourth arm means extending upwardly toward each other and being pivotally connected together adjacent their other ends, first and second link means extending between said first and fourth arm means, said second link means having projecting ends substantially in the shape of wedges, said second arm means having stub shafts extending laterally outwardly therefrom, roller means carried by said stub shafts, said projecting wedges of said second link means being adapted to engage said rollers when the rack is disposed adjacent to or in fully retracted position with respect to the supporting frame.

5. A pusher mechanism for an industrial truck having carriage means mounted thereon and including load engaging means extending forwardly of the truck for supporting a load to be carried by the truck comprising, a supporting frame adapted to be mounted on said carriage means to extend transversely of said load supporting means closely adjacent the inner end thereof, said supporting frame comprising a pair of side frame members extending vertically adjacent opposite sides of said load supporting means, and a pair of shafts extending horizontally between said side frame members one adjacent each of the upper and lower ends thereof, a load engaging rack adapted to extend substantially vertically above said load engaging means, and linkage means between said shafts and said rack comprising, first arm means mounted at one end on the shaft extending between the upper ends of said side frame members, second arm means pivotally mounted at one end adjacent the upper end of said rack, said first and second arm means extending downwardly toward each other and being pivotally connected together adjacent their other ends, third arm means mounted at one end of a shaft extending between the lower ends of said side frame members, fourth arm means pivotally mounted at one end adjacent the lower end of said rack, said third and fourth arm means extending upwardly toward each other and being pivotally connected together adjacent their other ends, first and second link means extending between said first and fourth arm means, said second link means having projecting ends substantially in the shape of wedges, said second arm means having stub shafts extending laterally outwardly therefrom, roller means carried by said stub shafts, said projecting wedges of said second link means being adapted to engage said rollers when the rack is disposed adjacent to or in fully retracted position with respect to the supporting frame, first crank means connected to the shaft between the upper ends of said side frame members and extending generally rearwardly of said supporting frame means, second crank means connected to the shaft between the lower ends of said side frame members and extending generally forwardly of said supporting frame, rod means pivotally connected at the opposite ends thereof to said first and second crank means, and means carried by said carriage means and having connection with said first crank means for effecting pivotal movement of the latter whereby said rack is moved fore and aft relative to the supporting frame.

ELMER J. DUNHAM.

REFERENCES CITED

The following references are of record in the file of this patent:

UNITED STATES PATENTS

| Number | Name | Date |
|---|---|---|
| 513,553 | Blakely et al. | Jan. 30, 1894 |
| 1,149,250 | Davis | Aug. 10, 1915 |
| 1,451,879 | Lacke | Apr. 17, 1923 |
| 2,122,992 | Pride | July 5, 1938 |
| 2,256,454 | Bomar | Sept. 16, 1941 |
| 2,496,079 | Wessman | Jan. 31, 1950 |

FOREIGN PATENTS

| Number | Country | Date |
|---|---|---|
| 474,968 | Germany | Apr. 17, 1929 |